United States Patent
Imai et al.

(10) Patent No.: US 6,550,122 B1
(45) Date of Patent: Apr. 22, 2003

(54) METHOD OF MANUFACTURING LAMINATED RING

(75) Inventors: Hitoshi Imai, Sayama (JP); Hitoshi Karasawa, Sayama (JP); Katsuyuki Nakajima, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 56 days.

(21) Appl. No.: 09/639,805

(22) Filed: Aug. 17, 2000

(30) Foreign Application Priority Data

| Oct. 22, 1999 | (JP) | ................................. 11-300747 |
| Nov. 9, 1999 | (JP) | ................................. 11-317787 |
| Mar. 1, 2000 | (JP) | ................................. 2000-055341 |

(51) Int. Cl.⁷ ............................................. C21D 9/40
(52) U.S. Cl. ......................... 29/417; 148/228; 148/230; 148/589
(58) Field of Search .................. 29/405, 417; 148/226, 148/228, 230, 529, 534, 589

(56) References Cited

U.S. PATENT DOCUMENTS 2,445,150 A * 7/1948 Mueller ..................... 148/589
2,732,323 A * 1/1956 Linnert ..................... 148/529
5,599,408 A * 2/1997 Fujita et al. ................. 148/607
6,309,474 B1 * 10/2001 Yagasaki ..................... 148/230

FOREIGN PATENT DOCUMENTS

| JP | 358159937 A1 * 9/1983 | ................. 148/521 |
| JP | 406235020 A1 * 8/1994 | ................. 148/607 |
| JP | 407001111 A1 * 1/1995 | |

* cited by examiner

Primary Examiner—Gregory M. Vidovich
Assistant Examiner—Jermie E. Cozart
(74) Attorney, Agent, or Firm—Birch, Stewart, Kolasch & Birch, LLP (57) ABSTRACT

A cylindrical drum is prepared by welding opposite ends of a thin sheet of maraging steel. A first solution treatment is effected on the cylindrical drum, and then the cylindrical drum is severed into a plurality of rings each having a predetermined width. After the rings are rolled, a second solution treatment is effected on the rings which have been rolled, and then the circumferential length of each of the rings is corrected. The rings are aged and nitrided, and then stacked into a laminated ring. The first solution treatment and the second solution treatment are effected using the same heating furnace in the same atmosphere in the same temperature range.

6 Claims, 9 Drawing Sheets

METHOD OF MANUFACTURING LAMINATED RING

BACKGROUND OF THE INVENTION

1. Field of the Invention

The present invention relates to a method of manufacturing a laminated ring for use in a continuously variable transmission or the like.

2. Description of the Related Art

Heretofore, laminated rings for use in continuously variable transmissions or the like have been manufactured as follows: The ends of a thin sheet of maraging steel which is an ultra-high strength steel are welded to each other, producing a cylindrical drum, which is subjected to a first solution treatment. Then, the drum is cut into a ring having a predetermined width. After the ring is rolled, it is subjected to a second solution treatment. The ring is corrected to a predetermined circumferential length, and then aged and nitrided. A plurality of rings thus treated are laminated into a laminated ring.

The first solution treatment that is effected on the welded drum in order to uniformize the hardness that has been locally increased due to the heat applied when the thin sheet of maraging steel was welded. The first solution treatment allows the ring cut from the drum to be rolled with ease. Generally, the solution treatment is carried out by heating the maraging steel to a temperature equal to or higher than the recrystallization temperature of the maraging steel. The maraging steel contains aging precipitation strengthening elements of Ti, Al, Mo, etc. If these elements, particularly Ti, are oxidized, then a desired hardness may not be achieved by the subsequent aging process. In order to avoid oxidization of the aging precipitation strengthening elements, the solution treatment is performed in a vacuum furnace.

The rolled ring has a rolled structure in which metal crystals are crushed by the rolling process. If the rolled structure remained unchanged, then nitrogen would not easily penetrate the ring in the subsequent nitriding process, and the ring would not uniformly be nitrided. The second solution treatment is effected on the rolled ring in order to recover the original metal crystal grains prior to being deformed for facilitating the nitriding process.

The second solution treatment is generally carried out by heating the maraging steel to a temperature equal to or higher than the recrystallization temperature of the maraging steel, and the aging precipitation strengthening elements should not be oxidized in the second solution treatment. Since the vacuum furnace is expensive, the second solution treatment is performed in a heating furnace which contains a reducing atmosphere. The reducing atmosphere comprises, for example, a nitrogen atmosphere containing 1 to 10% of hydrogen. While the nitrogen atmosphere contains a small amount of oxygen, the oxygen is removed from the system by reacting with the hydrogen. Therefore, the concentration of oxygen in the nitrogen atmosphere is low enough to suppress oxidization of the aging precipitation strengthening elements. According to the above manufacturing process, since the second solution treatment is performed in the reducing atmosphere using the heating furnace, the number of vacuum furnaces that are used is reduced for cutting down on the cost of the vacuum furnaces.

However, an increase in the cost incurred in manufacturing the laminated ring is unavoidable because of different furnaces used in the first and second solution treatments.

Figure 8:
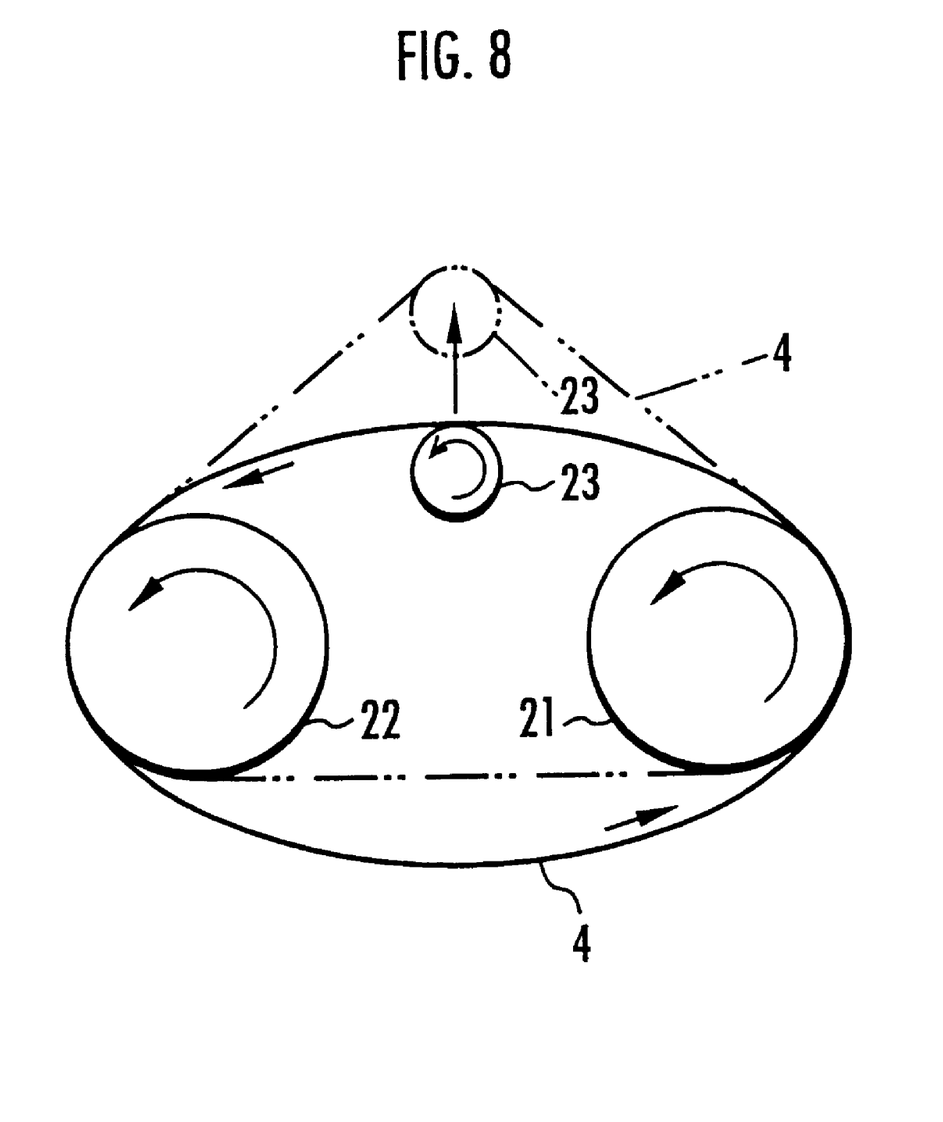
FIG. 8 is a view showing a process of correcting the circumferential surface of a ring.

The circumferential length of the ring which has been subjected to the second solution treatment is corrected as shown in FIG. 8 of the accompanying drawings. In FIG. 8, a ring 4 is trained under tension around a drive roller 21 and a driven roller 22. While the ring 4 is being rotated by the drive roller 21, a correction roller 23 disposed between the drive roller 21 and the driven roller 22 is moved in the direction indicated by the arrow. As a result, the ring 4 is loaded by the correction roller 23 in a direction perpendicular to the direction of travel between the drive roller 21 and the driven roller 22, and elongated to a predetermined length. In order to correct the circumferential length of the ring 4 appropriately, the ring 4 should preferably have an annular shape which is as close to a true circle as possible.

Figure 10:
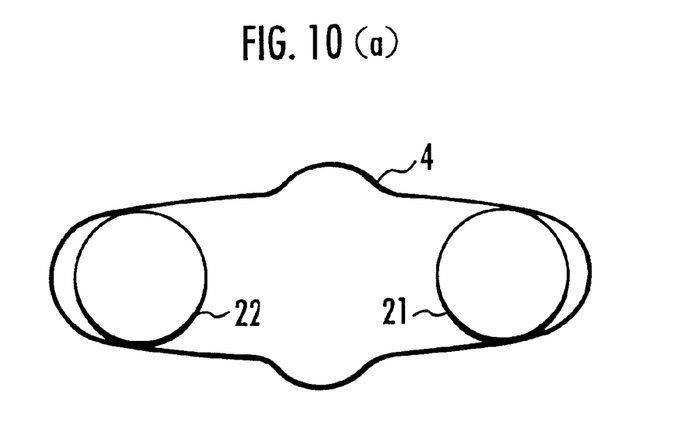
FIGS. 10(a) and 10(b) are views showing the shapes of rings after they have been subjected to a second solution treatment in a conventional method of manufacturing a laminated ring.

However, depending on the conditions of the second solution treatment, the ring 4 may suffer a thermal strain in the second solution treatment, and may be shaped to a complex irregular form, e.g., a substantially criss-cross shape as viewed in plan as shown in FIG. 10(a) of the accompanying drawings, or an extremely slender elliptical form as viewed in plan as shown in FIG. 10(b) of the accompanying drawings. If the ring 4 after the second solution treatment is of a shape as shown in FIG. 10(a) or 10(b), then when the ring 4 is trained around the drive roller 21 and the driven roller 22 for correcting the circumferential length thereof, the ring 4 may have portions that will not be brought into full contact with the rollers 21, 22. If the ring 4 thus shaped is corrected for its circumferential length, then the ring 4 may develop thickness irregularities as ring portions held in contact with the rollers 21, 22 and ring portions held out of contact with the rollers 21, 22 tend to have different thicknesses, and the ring 4 may have different circumferential lengths at opposite edges thereof.

SUMMARY OF THE INVENTION

It is therefore an object of the present invention to provide a method of manufacturing a laminated ring at a reduced cost by suppressing a thermal strain caused in a solution treatment after the ring has been rolled, thereby to correct the circumferential length of the ring appropriately with ease.

To achieve the above object, the inventors have studied conditions for a solution treatment to be effected on a welded cylindrical drum and a solution treatment to be effected on rolled rings. As a result, the inventors have found that if the conventional conditions for the solution treatment to be effected on rolled rings are made stricter, then such stricter conditions also applicable to the solution treatment to be effected on the welded cylindrical drum, and has completed the present invention based on the finding.

According to the present invention, there is provided a method of manufacturing a laminated ring, comprising the steps of preparing a cylindrical drum by welding opposite ends of a thin sheet of maraging steel, effecting a first solution treatment on the cylindrical drum, thereafter, severing the cylindrical drum into a plurality of rings each having a predetermined width, rolling the rings, effecting a second solution treatment on the rings which have been rolled, thereafter, correcting the circumferential length of each of the rings, thereafter, aging and nitriding the rings, and stacking the aged and nitrided rings into a laminated ring, the arrangement being such that the first solution treatment and the second solution treatment being effected using the same heating furnace in the same atmosphere in the same temperature range.

In the method according the present invention, a cylindrical drum is prepared by welding opposite ends of a thin sheet of maraging steel, and then placed into a heating furnace where a first solution treatment is effected on the cylindrical drum. Then, the cylindrical drum is severed into a plurality of rings each having a predetermined width, and the rings are rolled. The rolled rings are then placed into the heating furnace that has been used to effect the first solution treatment on the rings. In the heating furnace, a second solution treatment is effected on the rolled rings in the same atmosphere in the same temperature range as those of the first solution treatment, Thereafter, the circumferential length of each of the rings are corrected, and the rings are aged and nitrided. The aged and nitrided rings are stacked into a laminated ring.

By making stricter conditions for the second solution treatment to be effected on the rolled rings, the first solution treatment and the second solution treatment can be performed using the same heating furnace in the same atmosphere in the same temperature range. As a consequence, the laminated ring can be manufactured at a reduced cost because there is no need for separate furnaces to be used respectively for the first solution treatment and the second solution treatment.

Specifically, the stricter conditions for the second solution treatment to be effected on the rolled rings include limiting the range of dew points of a nitrogen atmosphere. The inventors have analyzed the relationship between the dew point of a nitrogen atmosphere used for the second solution treatment and the oxidization of aging precipitation strengthening elements in the first solution treatment. As a result, the inventors have found that when the dew point of the nitrogen atmosphere is in the range from −7 to 0° C., the aging precipitation strengthening elements, particularly, Ti, are less oxidizable. The inventors have also found that if the dew point of the nitrogen atmosphere is lower than −7° C., then Ti is selectively oxidized, and if the dew point of the nitrogen atmosphere is lower than −40° C., then oxidization of Ti is suppressed again.

In the method according to the present invention, the first solution treatment and the second solution treatment are effected in a temperature range from the recrystallization temperature of the maraging steel to 850° C. in either a nitrogen atmosphere that contains 1–10% of hydrogen and has a dew point ranging from −7 to 0° C., or a nitrogen atmosphere that contains 1–30% of hydrogen and has a dew point ranging from −70 to −40° C.

The nitrogen atmosphere contains a trace of oxygen and also contains hydrogen in the above range. Therefore, the oxygen is removed by being combined with the hydrogen, so that the concentration of oxygen in the nitrogen atmosphere is lowered.

If the dew point of the nitrogen atmosphere were higher than 0° C. in the first solution treatment, then the concentration of oxygen in the nitrogen atmosphere would be high, making it difficult to suppress the oxidization of Fe, which is the base material of the maraging steel, and also the oxidization of the aging precipitation strengthening elements of Ti, Al, Mo, etc.

If the dew point of the nitrogen atmosphere is in the range from −7 to 0° C., then the concentration of oxygen in the nitrogen atmosphere is lowered to such a level that Ti, Fe, and other aging precipitation strengthening elements of Mo, etc. are competitively oxidized. In this level of oxygen concentration, since a large amount of Fe existing as the base material is mainly oxidized, the oxidization of Ti is relatively suppressed.

If the dew point of the nitrogen atmosphere were in the range from −7 to −40° C., then the concentration of oxygen in the nitrogen atmosphere would be further lowered. Since Fe and Mo are reduced in this range, only Ti would selectively be oxidized.

If the dew point of the nitrogen atmosphere is in the range from −70 to −40° C., then the concentration of oxygen in the nitrogen atmosphere is highly lowered, making it possible to suppress the oxidization of Ti again. The nitrogen atmosphere is normally produced by evaporating liquid nitrogen. Since the dew point of the nitrogen atmosphere immediately after the evaporation of liquid nitrogen is −70° C., it is not practical to make the dew point lower than −70° C.

The nitrogen atmosphere is identical to the reducing atmosphere used in the second solution treatment in the conventional method of manufacturing a laminated ring, except that the conditions for the dew point are stricter. Therefore, no problem arises from using the nitrogen atmosphere for the second solution treatment.

Therefore, both the first solution treatment and the second solution treatment can be performed using the heating furnace under the same conditions.

If the nitrogen atmosphere contained less than 1% of hydrogen, then the trace of oxygen contained therein would not be removed sufficiently effectively. Furthermore, inasmuch as hydrogen is more expensive than nitrogen, if the amount of hydrogen exceeded 10% of the nitrogen atmosphere when the dew point is in the range from −7 to 0° C., or if the amount of hydrogen exceeded 30% of the nitrogen atmosphere when the dew point is in the range from −70 to −40° C., then the cost at which the laminated ring is manufactured would be increased.

If the temperature of the solution treatment were lower than the recrystallization temperature of the maraging steel, then the solution treatment itself would be difficult to perform, and if the temperature of the solution treatment exceeded 850° C., then since recrystallized metal grains would become coarse, the notch toughness of the laminated ring would be lowered.

The dew point in the range from −70 to −40° C. is preferable to the dew point in the range from −7 to 0° C. because it provides a wider dew point range for easy process control.

In the method according to the present invention, the second solution treatment is effected on the rings such that the rings after the second solution treatment in the atmosphere in the temperature range are of an annular shape.

Since the rings after the second solution treatment are of an annular shape, when each of the rings is trained around a drive roller and a driven roller for correcting its circumferential length, the ring can continuously be held in contact with the rollers. As a result, the rings are prevented from becoming irregular in wall thickness and also from having different circumferential lengths at opposite edges thereof, and the circumferential length of the rings can appropriately be corrected with ease.

If the temperature of the second solution treatment were lower than the recrystallization temperature of the maraging steel, then the solution treatment itself would be difficult to perform, and the rings would be deformed due to a thermal strain and shaped to a complex irregular form, e.g., a substantially criss-cross shape as shown in FIG. 10(a). If the temperature of the second solution treatment exceeded 850° C., then the tensile strength of the rings would be lowered because the recrystallized metal crystal grains would be made coarse.

If the rings as suspended from a hook were heated to a temperature equal to or higher than the recrystallization temperature of the maraging steel, then the rings would be prevented from having the substantially criss-cross shape as shown in FIG. 10(a), but would possibly be shaped to an extremely slender elliptical form as viewed in plan as shown in FIG. 10(b). The rings would be shaped to an extremely slender elliptical form because they would suffer creep due to gravity depending on conditions for the solution treatment when heated while being suspended from the hook.

The second solution treatment is effected on the rings by placing a peripheral edge of each of the rings on a floor of the heating surface. With the peripheral edge of each ring being placed on the floor of the heating furnace, the ring is prevented from suffering creep due to gravity, but is easily be shaped to an annular form.

With the rings being placed directly on the floor of the heating furnace, the portions of the rings held against the floor of the heating furnace and the other portions of the rings tend to be heated differently. For uniform heating of the rings, the second solution treatment is preferably effected on the rings by placing the peripheral edge of each of the rings on a metal mesh mounted on the floor of the heating surface.

The heating surface comprises a loading zone for replacing the atmosphere with the nitrogen atmosphere and introducing the welded cylindrical drum or the rolled rings into the nitrogen atmosphere, a first zone for heating the cylindrical drum or the rings to the temperature range, a second zone for maintaining the cylindrical drum or the rings in the temperature range for a predetermined period of time, a third zone for cooling the cylindrical drum or the rings, and an unloading zone for replacing the nitrogen atmosphere with the atmosphere and unloading the cylindrical drum or the rings, the arrangement being such that the first solution treatment and the second solution treatment are effected by continuously supplying the cylindrical drum or the rings into the loading zone, delivering the cylindrical drum or the rings successively through the first zone, the second zone, and the third zone, and unloading the cylindrical drum or the rings from the unloading zone.

In the heating furnace thus constructed, the loading and unloading zones reliably isolate the atmosphere in the heating furnace from the external atmosphere, so that the atmosphere in the heating furnace is prevented from being disturbed when the drum or the rings are loaded into and unloaded from the heating furnace. Furthermore, since the welded drum or the rolled rings are continuously supplied to the heating furnace, and subjected to the solution treatment while being delivered successively through the first zone, the second zone, and the third zone, the solution treatment can continuously be effected on the drum or the rings.

The first solution treatment and the second solution treatment may be effected either separately for respective different periods of time or simultaneously for the same period of time.

The second solution treatment takes more time than the first solution treatment in order to recover the original metal crystal grains of the rings prior to being rolled. Therefore, if the first solution treatment and the second solution treatment are effected simultaneously for the same period of time, the period of time should preferably be equalized to the period of time required to effect the second solution treatment on the rings.

The rings that have been subjected to the second solution treatment are corrected for their circumferential length and then aged and nitrided. Since the oxidization of the aging precipitation strengthening elements of Ti, etc. is suppressed, the rings can be aged uniformly. Furthermore, inasmuch as the original metal crystal grains of the rings prior to being rolled are recovered in the second solution treatment, nitrogen can easily penetrate the rings, and hence the rings can easily be nitrided.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
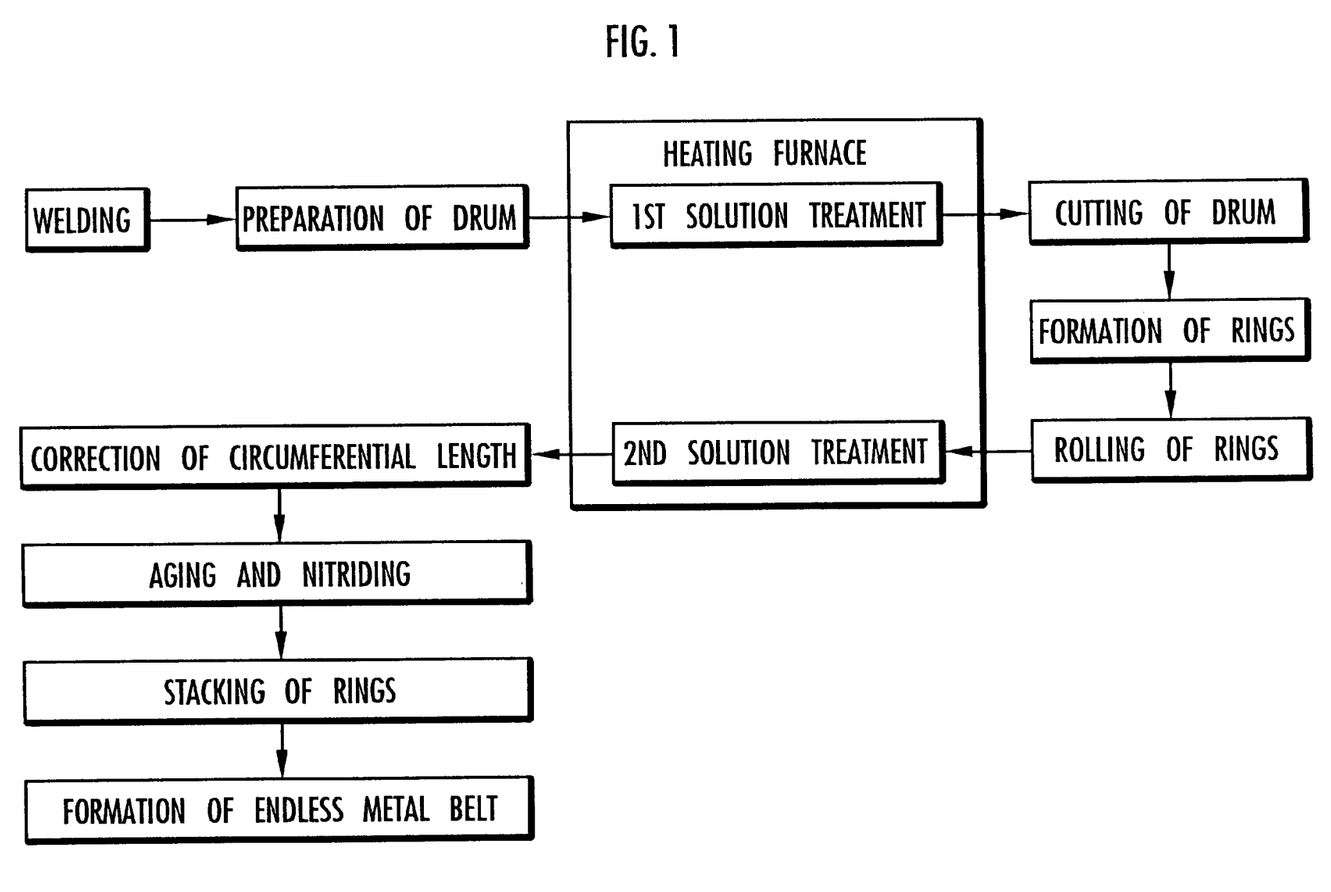
FIG. 1 is a block diagram illustrative of a method of manufacturing a laminated ring according to the present invention.
Figure 2:
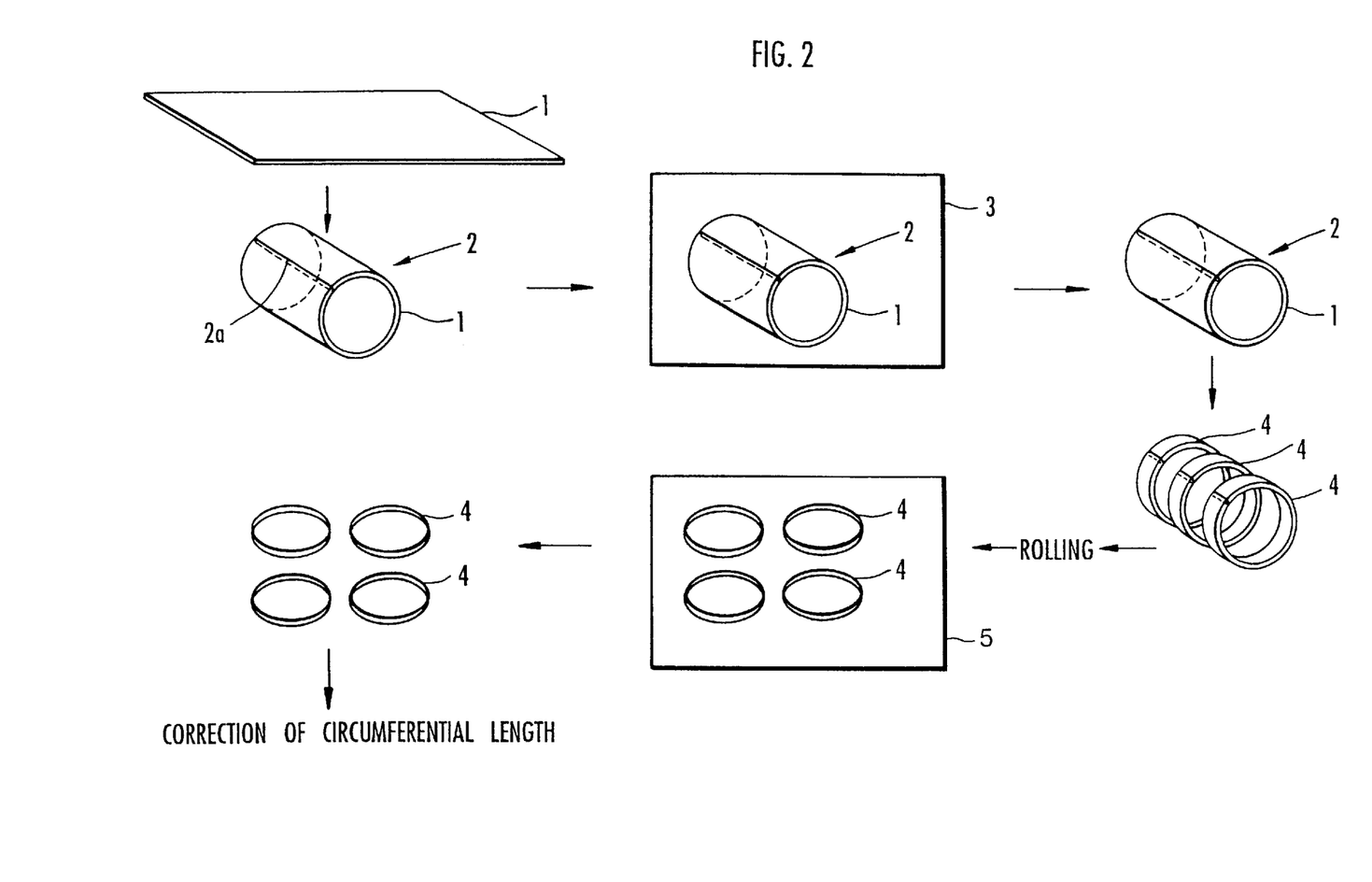
FIG. 2 is a view schematically showing various steps of the method illustrated in FIG. 1.

In a method of manufacturing a laminated ring according to the present invention, as shown in FIGS. 1 and 2, a thin sheet 1 of maraging steel is bent into a loop, whose opposite ends are welded to each other to produce a cylindrical drum 2. The maraging steel is a low-carbon steel containing 0.03% or less of C, 0.10%5 or less of Si, 0.10% or less of Mn, 0.01% or less of P, and 0.01% or less of S, for example, or a 18Ni steel containing 18–19% of Ni, 4.7–5.2% of Mo, 0.05–0.15% of Al, 0.50–0.70% of Ti, and 8.5–9.5% of Co. When the maraging steel of the above composition is welded as described above, it exhibits aged hardness due to the heat applied when the thin sheet 1 of maraging steel was welded. Therefore, the cylindrical drum 2 has regions, each about 1 mm wide, of increased hardness on opposite sides of a welded seam 2a thereof.

The drum 2 is placed in a heating furnace 3 which contains a reducing atmosphere therein, and subjected to a first solution treatment in a temperature range from the recrystallization temperature of the maraging steel to 850°

Figure 3:
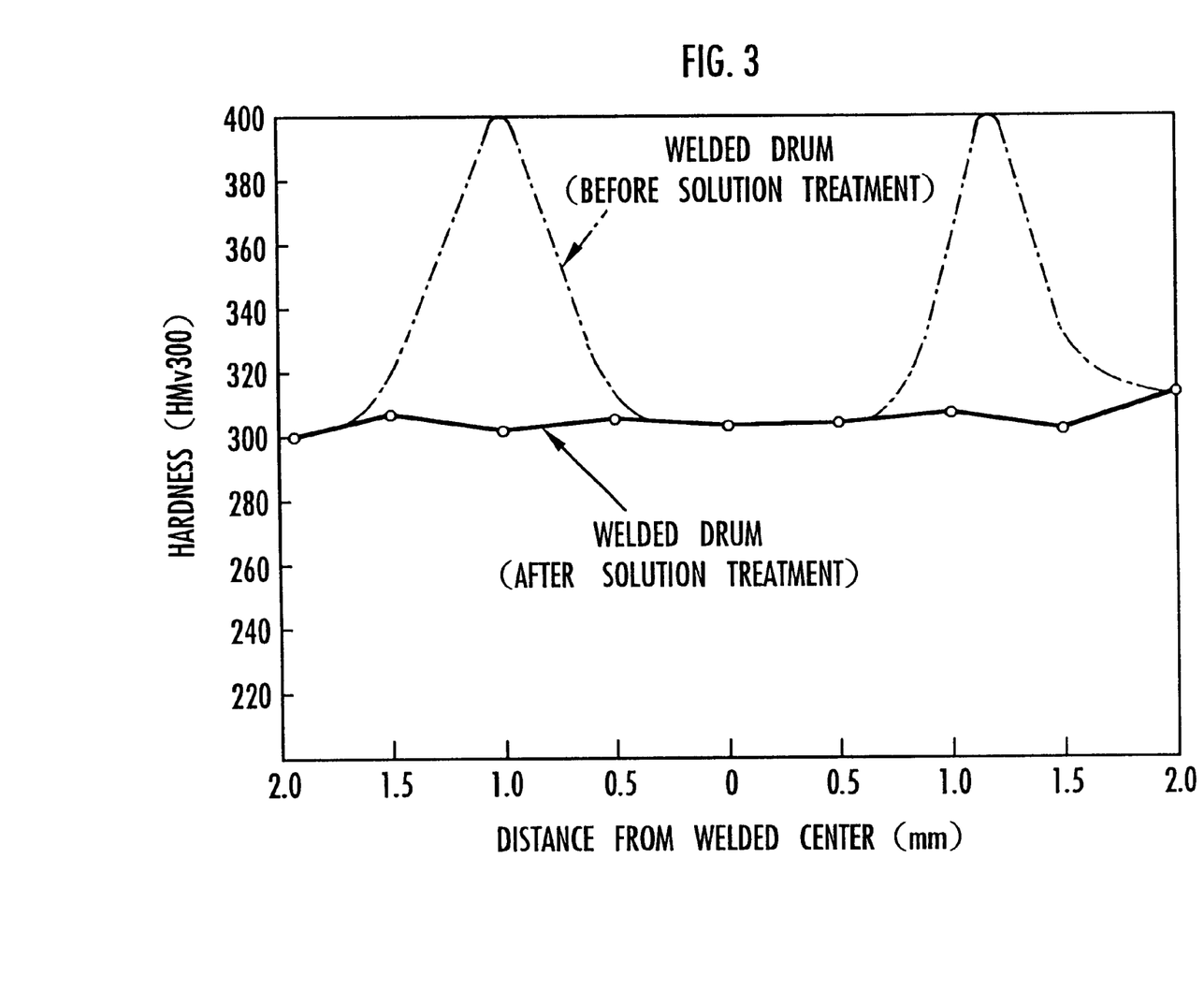
FIG. 3 is a graph showing hardnesses of a welded drum before and after a first solution treatment in the method according to the present invention.

C. The reducing atmosphere comprises a nitrogen atmosphere that contains 1–10% of hydrogen, e.g., 4% of hydrogen, and has a dew point ranging from −7 to 0° C., or a nitrogen atmosphere that contains 1–30% of hydrogen and has a dew point ranging from −70 to −40° C. When the drum 2 is placed in the heating furnace 3 and subjected to the first solution treatment under the above conditions, the regions of increased hardness are eliminated from the drum 2, and the overall hardness of the drum 2 is uniformized, as shown in FIG. 3. FIG. 3 shows data of the drum 2 which was subjected to the first solution treatment in a nitrogen atmosphere containing 4% of hydrogen and having a dew point ranging from −7 to 0° C.

In the heating furnace 3, the nitrogen atmosphere contains a trace of oxygen, but the concentration of oxygen is reduced when it is combined with hydrogen. As a result, three aging precipitation strengthening elements of Ti, Al, Mo, among the elements that make up the maraging steel, are prevented from being oxidized, making it possible to achieve uniform aged hardness in a subsequent aging process.

The surface of the drum 2 after the first solution treatment was analyzed by an electron probe X-ray microanalysis (EPMA). Since Ti, Al, etc. are P-type elements, they tend to spread outwardly in the metal structure, and are liable to be easily oxidized on the metal surface. According to the EPMA, regions where the Ti concentration is high become reddish, and regions where the Ti concentration is low become yellowish.

The result of the EPMA confirmed that reddish regions of the drum 2 which was treated under the above conditions in the nitrogen atmosphere containing 4% of hydrogen and having a dew point ranging from −7 to 0° C. were discrete, and Ti was oxidized to the same extent as a drum subjected to a solution treatment in a conventional vacuum furnace of $10^{-3}$ Pa.

It was also confirmed that the drum 2 treated under the above conditions in the nitrogen atmosphere containing 1–30% of hydrogen and having a dew point ranging from −70 to −40° C. had yellowish regions in the surface layer where Ti was not oxidized, indicating that oxidization of Ti was suppressed to the same extent as the drum subjected to a solution treatment in the conventional vacuum furnace of $10^{-3}$ Pa.

It was also confirmed that the drum 2 treated under the above conditions in the nitrogen atmosphere containing 1–30% of hydrogen and having a dew point of −30° C. outside of the range according to the present invention had reddish regions near the surface layer where the concentration of Ti was high, resulting in the assumption that Ti was oxidized.

If the dew point of the nitrogen atmosphere in the heating furnace is outside of the range according to the present invention, then Ti contained in the maraging steel is oxidized in the first solution treatment, clearly showing that it is difficult to carry out the first solution treatment in the same heating furnace 3 as the second solution treatment.

After the first solution treatment, as shown in FIGS. 1 and 2, the drum 2 is removed from the heating furnace 3, and severed into a plurality of rings 4 each having a predetermined width. Since the overall hardness of the drum 2 has been uniformized in the first solution treatment, it can easily be cut into rings 4 which will easily be rolled. Thereafter, the rings 4 are rolled by a rolling reduction ranging from 40 to 50%, so that they have a predetermined circumferential length.

The rolled rings 4 have a rolled structure in which metal crystals are crushed by the rolling process. If the rolled structure remained unchanged, then nitrogen would not easily penetrate the metal structure of the rings 4. According to the present embodiment, the rings 4 are placed back into the heating furnace 3, and are subjected to a second solution treatment in the same temperature range and the same reducing atmosphere as the first solution treatment, i.e., in a temperature range from the recrystallization temperature of the maraging steel to 850° C. in a reducing atmosphere, i.e., a nitrogen atmosphere, which comprises a nitrogen atmosphere that contains 1–10% of hydrogen, e.g., 4% of hydrogen, and has a dew point ranging from −7 to 0° C., or a nitrogen atmosphere that contains 1–30% of hydrogen and has a dew point ranging from −70 to −40° C. The second solution treatment is carried out under the above conditions in order for the rings 4 to recover the original metal crystal grains prior to being rolled and also to take an annular shape after the solution treatment.

Figure 4:
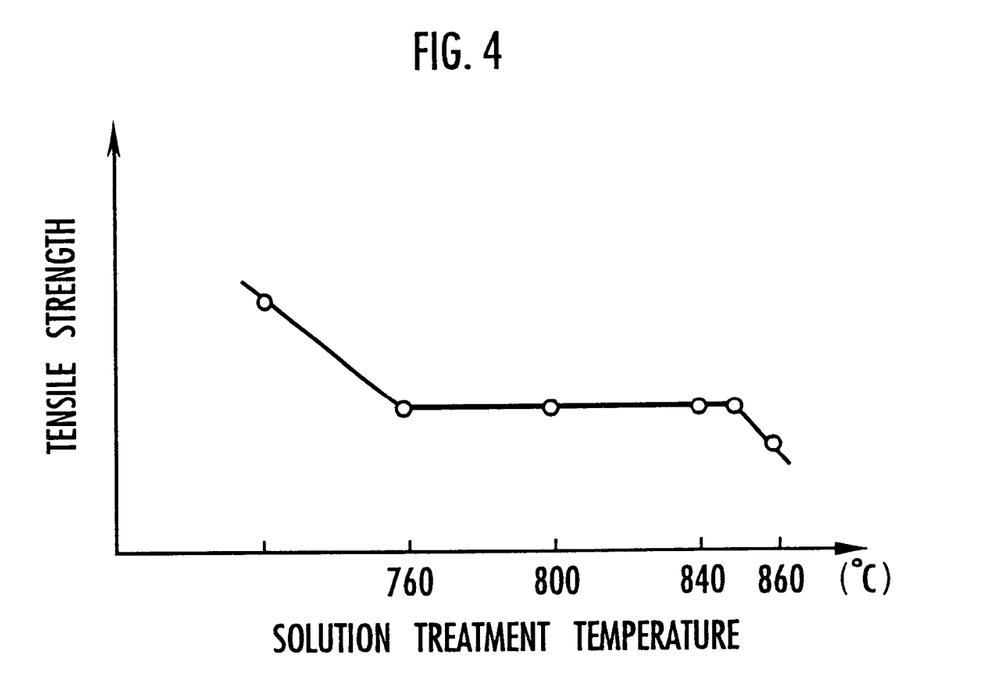
FIG. 4 is a graph showing the relationship between the solution treatment temperature of a rolled ring and the tensile strength of the ring.

The recrystallization temperature of the maraging steel differs depending on the composition of the maraging steel. For example, the recrystallization temperature of the 18Ni-maraging steel is about 760° C. The tensile strength of the rings 4 of the 18Ni-maraging steel, which have been subjected to the solution treatment in the nitrogen atmosphere containing 4% of hydrogen and having a dew point ranging from −7 to 0° C., is constant when heated in a temperature range from 760 to 850° C., as shown in FIG. 4, clearly showing that the rings 4 are recrystallized in such a temperature range. When the rings 4 are heated at a temperature lower than 760° C., their tensile strength is greater than when heated in the temperature range from 760 to 850° C., indicating that recrystallization of the metal structure cannot easily be performed. When the rings 4 are heated at a temperature higher than 850° C., their tensile strength is smaller than when heated in the temperature range from 760 to 850° C., indicating that the metal structure is excessively recrystallized, generating coarse crystals.

The processes shown in FIGS. 1 and 2 are successively carried out. When the rings 4 are subjected to the second solution treatment, another thin sheet 1 of maraging steel has been welded into a next cylindrical drum 2. In this embodiment, the first solution treatment and the second solution treatment are carried out using the same heating furnace in the same atmosphere and the same temperature range. Therefore, the rings 4 can be subjected to the second solution treatment at the same time the next drum 2 is subjected to the first solution treatment.

Figure 5:
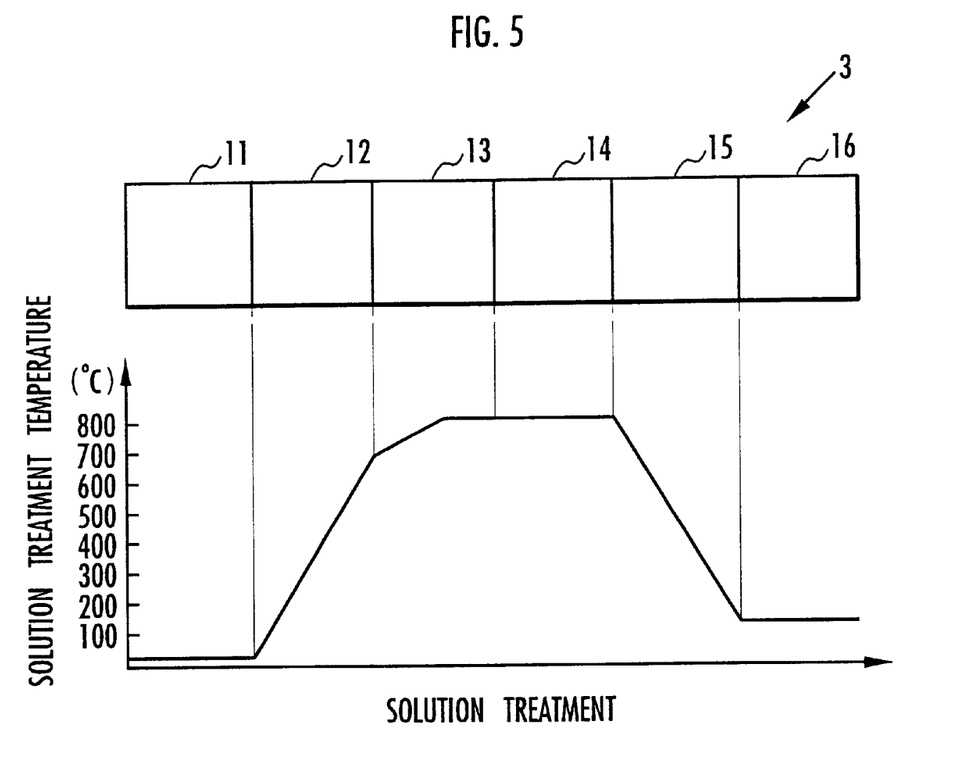
FIG. 5 is a diagram showing the relationship between the arrangement of a continuous solution treatment furnace used in a second solution treatment in the method according to the present invention and the temperatures in chambers of the continuous solution treatment furnace.

In the present embodiment, a heating furnace 3 shown in FIG. 5 is used to effect the first solution treatment and the second solution treatment. As shown in FIG. 5, the heating furnace 3 comprises a succession of six chambers, i.e., a vacuum loading chamber 11, a first heating chamber 12, a second heating chamber 13, a third heating chamber 14, a gas cooling chamber 15, and a vacuum unloading chamber 16. The vacuum loading chamber 11 is a zone where the drum 2 and the rings 4 are introduced. While the drum 2 and the rings 4 that have been loaded are moving in the vacuum loading chamber 11 toward the first heating chamber 12, the vacuum loading chamber 11 is evacuated by removing the atmosphere therefrom, and then supplied with nitrogen, developing a nitrogen atmosphere therein.

The heating chambers 12, 13, 14 are zones for heating the drum 2 and the rings 4 in the nitrogen atmosphere. Specifically, while the drum 2 and the rings 4 introduced from the vacuum loading chamber 11 are moving in the first heating chamber 12 toward the second heating chamber 13, the first heating chamber 12 is heated from the room temperature up to about 700° C., for example. While the drum 2 and the rings 4 introduced from the first heating chamber 12 are moving in the second heating chamber 13 toward the third heating chamber 14, the second heating chamber 13 heats the drum 2 and the rings 4 up to a temperature for the solution treatment, e.g., 820° C., and holds the drum 2 and the rings 4 at the temperature. While the drum 2 and the rings 4 introduced from the second heating chamber 13 are moving in the third heating chamber 14 toward the gas cooling chamber 15, the third heating chamber 14 holds the drum 2 and the rings 4 up to the temperature for the solution treatment.

The gas cooling chamber 15 is a zone for cooling the drum 2 and the rings 4 which have been subjected to the solution treatment, in the nitrogen atmosphere. While the drum 2 and the rings 4 introduced from the third heating chamber 14 are moving in the gas cooling chamber 15 toward the vacuum unloading chamber 16, the gas cooling chamber 15 cools the drum 2 and the rings 4 to a temperature equal to or lower than 150° C., for example. The vacuum unloading chamber 16 is a zone for unloading the drum 2 and the rings 4 which have been subjected to the solution treatment out of the heating furnace 3. While the drum 2 and the rings 4 introduced from the gas cooling chamber 15 are being unloaded out of the heating furnace 3, the vacuum unloading chamber 16 is evacuated by removing the nitrogen atmosphere therefrom, and then supplied with the external atmosphere, thus replacing the nitrogen atmosphere with the external atmosphere.

After the drum 2 and the rings 4 are introduced into the vacuum loading chamber 11, the drum 2 and the rings 4 are delivered toward the vacuum unloading chamber 16, passing through each chamber in 40 minutes. As a result, while the drum 2 and the rings 4 are passing through each of the heating chambers 12, 13, 14, the drum 2 and the rings 4 are maintained at the temperature for the solution treatment, e.g., 820° C., for 30 minutes, and hence are simultaneously subjected to the solution treatment for the same period of time.

Figure 6:
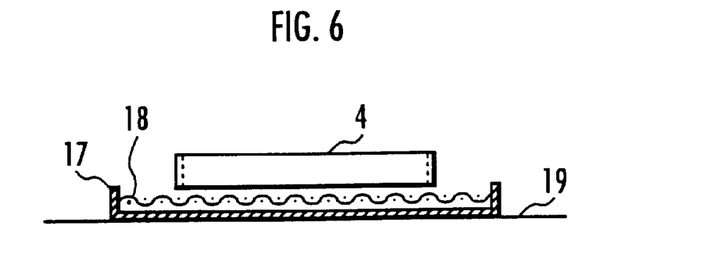
FIG. 6 is a cross-sectional view showing the placement of a ring in a heating furnace.

In the heating furnace 3, as shown in FIG. 6, each of the rings 4 has its peripheral edge placed on a metal mesh 18 mounted in a base tray 17 on a furnace floor 19. Therefore, the rings 4 are prevented from suffering creep, and can easily take the annular shape in the solution treatment. The peripheral edge of each of the rings 4 may directly be placed on the furnace floor 19.

Figure 7:
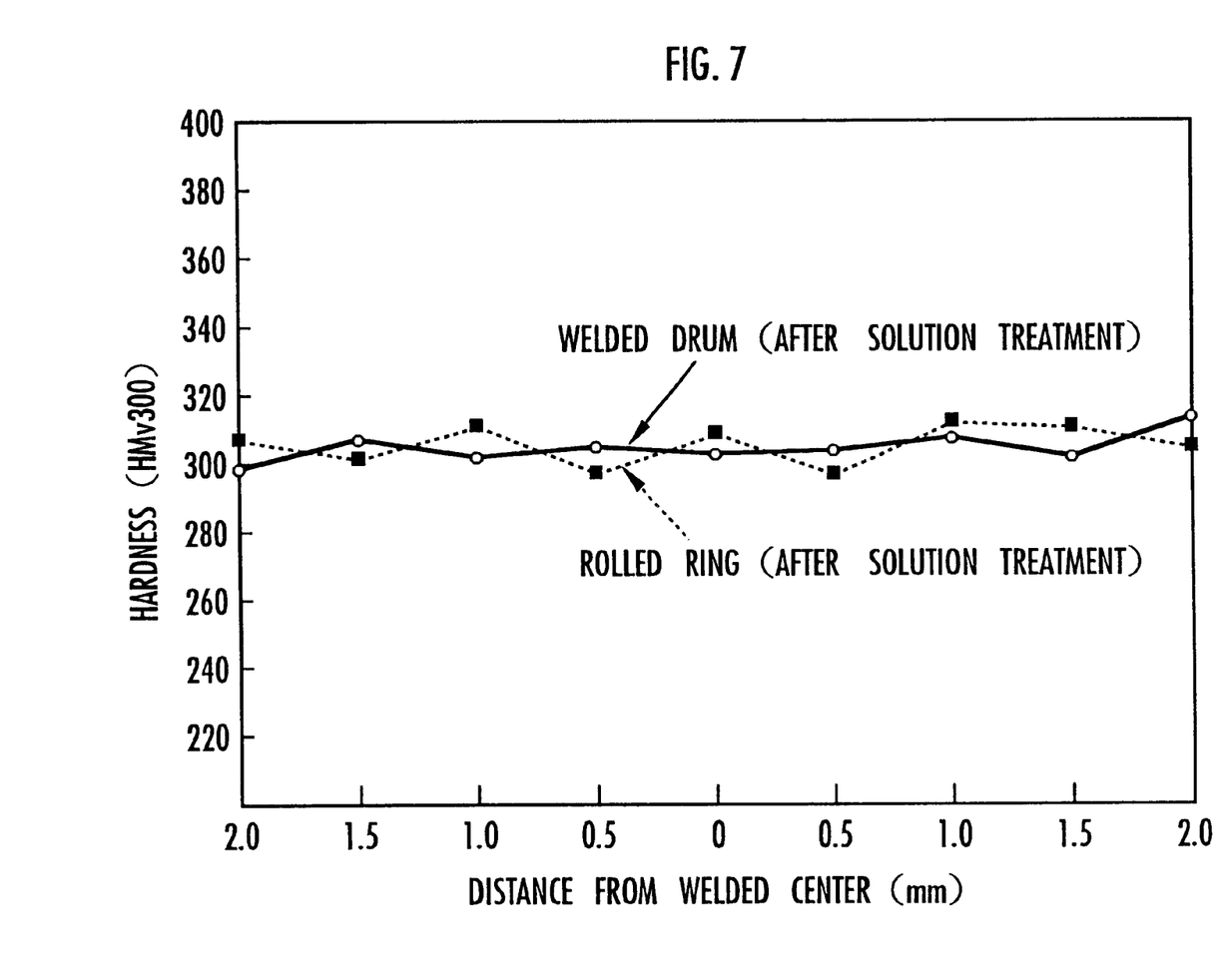
FIG. 7 is a graph showing the hardnesses of the welded drum and the rolled ring after they have been subjected to a solution treatment in the method according to the present invention.

The hardnesses of various portions of each of the rings 4 after the second solution treatment are shown in FIG. 7. As shown in FIG. 7, the overall hardness of the rings 4 after the second solution treatment is uniformized, clearly indicating that the metal crystal grains prior to being rolled are recovered. It can also be seen from FIG. 7 that the hardness of the rings 4 after the second solution treatment is substantially the same as the hardness of the drum 2 after the first solution treatment, showing that the drum 2 and the rings 4 are uniformly hardened to the same extent when they are subjected to the solution treatment under the same conditions. The hardness of the drum 2 after the first solution treatment, shown in FIG. 7, is based on the same data as the hardness of the drum 2 shown in FIG. 3.

The rings 4 which have been subjected to the solution treatment as described above are removed from the heating furnace 3. Thereafter, as shown in FIG. 8, each of the rings 4 is trained around a drive roller 21 and a driven roller 22. While the ring 4 is being rotated by the drive roller 21, a correction roller 23 disposed between the drive roller 21 and the driven roller 22 is moved in the direction indicated by the arrow for thereby correcting the circumferential length of the ring 4. Since the ring 4 has been made annular in shape by the second solution treatment, the ring 4 is continuously held in contact with the rollers 21, 22 without interrupted contact therewith. When the ring 4 is loaded by the correction roller 23 in a direction perpendicular to the direction of travel between the drive roller 21 and the driven roller 22, the circumferential length of the ring 4 is corrected appropriately such that the wall thickness of the ring 4 is uniform and the circumferential lengths at the opposite edges of the ring 4 are equalized.

Figure 9:
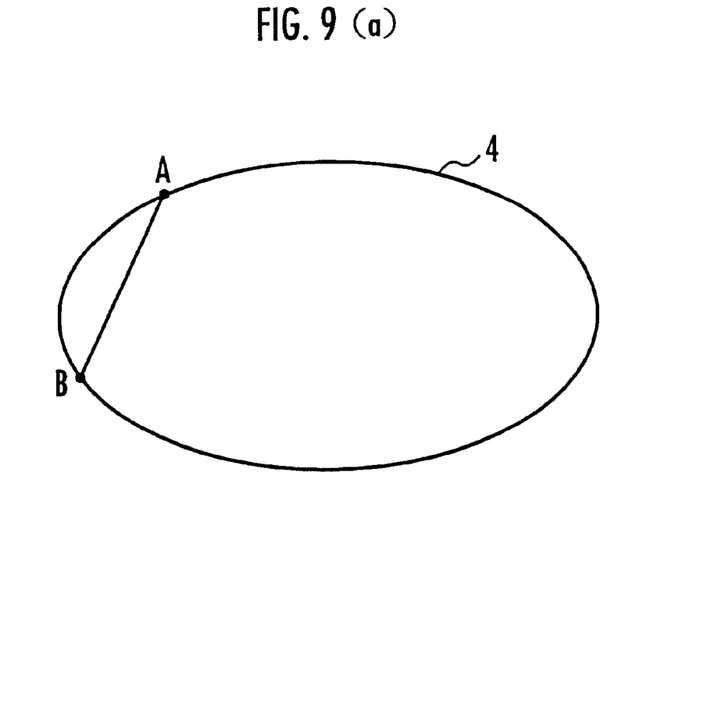
FIGS. 9(a) and 9(b) are views showing the shape of a ring after it has been subjected to a second solution treatment in the method according to the present invention.

The annular shape of the ring 4 is preferably such that a line segment AB interconnecting two arbitrary points A, B on the ring 4 is located inside of the ring 4 at all times, as shown in FIG. 9(a), and the curvature of the ring 4 is equal to or smaller than the curvature of the rollers 21, 22, as shown in FIG. 9(b).

Then, as shown in FIG. 1, the rings 4 whose circumferential length has been corrected are aged and nitrided. The rings 4 are aged by holding the rings 4 in a temperature range from 450 to 530° C. for 90 to 240 minutes, for example, within a heating surface (not shown). The rings 4 are nitrided by a gas nitriding process, a gas soft nitriding process, a salt-bath nitriding process, or the like.

The rings 4 which have been set to a desired hardness by the aging and nitriding processes are stacked together to produce a laminated ring (not shown) for use as a continuously variable transmission belt.

In the method according to the above embodiment, since oxidization of aging precipitation strengthening elements is suppressed in the first solution treatment, rings whose circumferential lengths have been corrected can uniformly be aged. Furthermore, since the original metal crystal grains of the metal structure prior to being rolled are restored, nitrogen can easily penetrate the rolled structure, allowing the drum and the rings to be nitrided with ease.

Moreover, because the first solution treatment and the second solution treatment are carried out using the same heating furnace 3 in the same atmosphere in the same temperature range, the equipment used can be shared by the first solution treatment and the second solution treatment, and hence the laminated ring can be manufactured at a reduced cost.

In the method according to the illustrated embodiment, the rolled rings 4 and the next drum 2 are supplied together into the heating furnace 3, and are subjected to the solution treatment for the same period of time. However, the first solution treatment of the drum 2 and the second solution treatment of the rings 4 may separately be performed respectively for different periods of time. If the first solution treatment of the drum 2 and the second solution treatment of the rings 4 are performed separately from each other, a partition (not shown), for example, may be disposed in the heating furnace 3 to divide the interior space thereof into two regions, and the drum 2 and the rings 4 may independently be delivered in the respective regions of the heating furnace 3.

Although a certain preferred embodiment of the present invention have been shown and described in detail, it should be understood that various changes and modifications may be made therein without departing from the scope of the appended claims.

What is claimed is:

1. A method of manufacturing a laminated ring, comprising the steps of:

preparing a cylindrical drum by welding opposite ends of a thin sheet of a maraging steel;

effecting a first solution treatment on said cylindrical drum;

thereafter, severing said cylindrical drum into a plurality of rings each having a predetermined width;

rolling said rings;

effecting a second solution treatment on said rings which have been rolled;

thereafter, correcting a circumferential length of each of said rings;

thereafter, aging and nitriding the rings; and stacking the aged and nitrided rings into a laminated ring;

wherein said first solution treatment and said second solution treatment are effected simultaneously for the same period of time using one heating furnace, each of said treatments being performed at a temperature range of from about 760–850° C. and in an atmosphere including 1–10% of hydrogen and having a dew point ranging from −7 to 0° C., or in a nitrogen atmosphere including 1–30% of hydrogen and having a dew point ranging from −70 to −40° C., said maraging steel being recrystallized at a temperature of about 760° C.

2. A method according to claim 1, wherein said second solution treatment is effected on said rings such that the rings after the second solution treatment in said atmosphere in said temperature range are of an annular shape.

3. A method according to claim 2, wherein said second solution treatment is effected on said rings by placing a peripheral edge of each of the rings on a floor of said heating furnace.

4. A method according to claim 3 wherein said second solution treatment is effected on said rings by placing the peripheral edge of each of the rings on a metal mesh mounted on the floor of said heating furnace.

5. A method according to claim 1, wherein said heating furnace comprises a loading zone supplied with the nitrogen atmosphere and introducing the welded cylindrical drum or the rolled rings into the nitrogen atmosphere, a first zone for heating the cylindrical drum or the rings to said temperature range, a second zone for maintaining the cylindrical drum or the rings in said temperature range for a predetermined period of time, a third zone for cooling the cylindrical drum or the rings, and an unloading zone for replacing said nitrogen atmosphere with an atmosphere and unloading the cylindrical drum or the rings, said first solution treatment and said second solution treatment being effected by continuously supplying the cylindrical drum or the rings into said loading zone, delivering the cylindrical drum or the rings successively through said first zone, said second zone, and said third zone, and unloading the cylindrical drum or the rings from said unloading zone.

6. A method according to claim 1, wherein said first solution treatment and said second solution treatment are effected simultaneously for the same period of time, said period of time being the time required to effect said second solution treatment on said rings, since said second solution treatment takes more time than said first solution treatment.

* * * * *